US012559656B2

(12) United States Patent
Li et al.

(10) Patent No.: US 12,559,656 B2
(45) Date of Patent: Feb. 24, 2026

(54) SOLVENT-FREE MOISTURE CURING SILICONE CONFORMAL COATING AND PREPARATION METHOD THEREOF

(71) Applicant: CHENGDU TALY TECHNOLOGY CO., LTD., Chengdu (CN)

(72) Inventors: Qiang Li, Chengdu (CN); Hongmei Li, Chengdu (CN); Hua Tang, Chengdu (CN); Wanxiong Jiang, Chengdu (CN); Yu Qin, Chengdu (CN); Ling Tang, Chengdu (CN); Chengxi Zhang, Chengdu (CN); Yunfeng Tao, Chengdu (CN)

(73) Assignee: CHENGDU TALY TECHNOLOGY CO., LTD., Chengdu (CN)

( * ) Notice: Subject to any disclaimer, the term of this patent is extended or adjusted under 35 U.S.C. 154(b) by 589 days.

(21) Appl. No.: 17/773,109

(22) PCT Filed: May 13, 2021

(86) PCT No.: PCT/CN2021/093531
§ 371 (c)(1),
(2) Date: Apr. 29, 2022

(87) PCT Pub. No.: WO2021/228184
PCT Pub. Date: Nov. 18, 2021

(65) Prior Publication Data
US 2024/0059944 A1 Feb. 22, 2024

(30) Foreign Application Priority Data
May 14, 2020 (CN) ......................... 202010408293.2

(51) Int. Cl.

| | |
|---|---|
| ***C09J 183/08*** | (2006.01) |
| ***C08G 77/08*** | (2006.01) |
| ***C08G 77/18*** | (2006.01) |
| ***C08G 77/26*** | (2006.01) |
| ***C08G 77/388*** | (2006.01) |
| ***C08K 5/544*** | (2006.01) |
| ***C09J 11/06*** | (2006.01) |
| ***C09J 183/06*** | (2006.01) |

(52) U.S. Cl.
CPC ............ *C09J 183/08* (2013.01); *C08G 77/08* (2013.01); *C08G 77/18* (2013.01); *C08G 77/26* (2013.01); *C08G 77/388* (2013.01); *C08K 5/544* (2013.01); *C09J 11/06* (2013.01); *C09J 183/06* (2013.01)

(58) Field of Classification Search
CPC ..... C09D 183/04; C09D 183/08; C08L 83/04; C08L 83/00; C08L 83/08; C08K 5/544; C08K 5/5419; C08K 5/5465; C08K 5/5425
See application file for complete search history.

(56) References Cited

U.S. PATENT DOCUMENTS

| | | | |
|---|---|---|---|
| 5,473,026 A | 12/1995 | Strong et al. | |
| 2018/0133360 A1* | 5/2018 | Bingol | C09J 183/04 |
| 2019/0177541 A1* | 6/2019 | Stanjek | C09D 183/04 |

FOREIGN PATENT DOCUMENTS

| | | |
|---|---|---|
| CN | 101805562 A | 8/2010 |
| CN | 101942288 A | 1/2011 |
| CN | 104177623 A | 12/2014 |
| CN | 104693805 A | 6/2015 |
| CN | 105008432 A | 10/2015 |
| CN | 105566917 A | 5/2016 |
| CN | 109233620 A | 1/2019 |
| CN | 110713818 A | 1/2020 |
| CN | 111440531 A | 7/2020 |
| KR | 20060002926 A | 1/2006 |

OTHER PUBLICATIONS

International Search Report for International Application No. PCT/CN2021/093531 dated Jun. 8, 2021.
First Office Action of Application No. 202010408293.2, The State Intellectual Property Office of People's Republic of China, dated Mar. 31, 2021.
Second Office Action of Application No. 202010408293.2, The State Intellectual Property Office of People's Republic of China, dated Oct. 25, 2021.

* cited by examiner

*Primary Examiner* — Robert T Butcher
(74) *Attorney, Agent, or Firm* — Ballard Spahr LLP

(57) ABSTRACT

The present disclosure relates to a solvent-free moisture curing silicone conformal coating used for the surface protection of circuit boards in the electrical and electronic industries and a preparation method thereof. The solvent-free moisture curing silicone conformal coating comprises (A) a hydrolyzable functional group-terminated linear polysiloxane (I); (B) a hydrolyzable functional group-containing silicone resin with a three-dimensional structure (II); (C) a hydrolyzable functional group-containing crosslinking agent; (D) a catalyst; (E) an adhesion promoter. The solvent-free conformal coating of the present disclosure has low viscosity, high strength and good toughness, and can meet the traditional coating process such as spraying, brushing, dipping, etc., while satisfying the surface protection of the circuit board. Compared with the traditional solvent-based silicon conformal coating, the solvent-free silicon conformal coating can be cured by moisture, the VOC content released during the curing process is low, and the harm to the environment and occupational health is small.

20 Claims, No Drawings

SOLVENT-FREE MOISTURE CURING SILICONE CONFORMAL COATING AND PREPARATION METHOD THEREOF

CROSS REFERENCE TO RELATED APPLICATION

This patent application claims the benefit and priority of Chinese Patent Application No. 202010408293.2 filed on May 14, 2020, and International Application No. PCT/CN2021/093531, filed on May 13, 2021, the disclosures of which are incorporated by reference herein in their entirety as part of the present application.

TECHNICAL FIELD

The present disclosure relates to a solvent-free moisture curing silicone conformal coating, which can be used for the three-proof treatment of the surface of circuit boards in the electrical and electronic industries, and belongs to the technical field of three-proof coatings.

BACKGROUND

Under the actual operating conditions of the electrical and electronic industries, such as chemical, vibration, dust, salt spray, moisture, high temperature, etc., the circuit board may suffer from corrosion, softening, deformation, mildew, etc., resulting in short circuit and other failures. In order to avoid the above failures caused by environmental factors, it is generally necessary to coat a layer of three-proof paint on the surface of circuit boards to form a three-proof film (three-proof generally refers to moisture-proof, salt-spray-proof, and mildew-proof).

The commonly used three-proof conformal coatings mainly include polyurethane, acrylic (including solvent-based, UV-curable, etc.), alkyd resin, silicone, etc. Compared with the three-proof conformal coatings of other systems, silicone materials, due to the semi-organic and semi-inorganic structure containing Si—O—Si, have excellent resistance to high and low temperatures, and good physiological inertia, which have little impact on human skin and mucous membranes during operation. Traditional silicone conformal coatings generally contain a lot of solvents. For example, Dow Corning resin coating 1-2577 contains a large amount of toluene or octamethyltrisiloxane; at present, the elastic silicone conformal coatings that are widely used on the market use a large number of solvents such as gasoline, petroleum ether and toluene. The use of solvents, on the one hand, increases the cost of solvent recovery, but also easily causes environmental hazards and increased safety risks. At the same time, it may also cause harm to the permanent occupational health of operators. With global warming, environmental protection requirements, and the improvement of laws and regulations, the use of solvents is subjected to more and more stringent controls. The development of solvent-free silicone conformal coatings is an urgent need for end customers in the silicone manufacturing industry and the electrical and electronic industries.

SUMMARY

The first objective of the present disclosure is to develop a solvent-free silicone conformal coating based on the characteristic that the current silicon conformal coatings contain a large amount of solvents. Different from the traditional hydroxyl-terminated linear polysiloxane system, the present disclosure uses a combination of a hydrolyzable functional group-terminated linear polysiloxane and a hydrolyzable functional group-containing resin. While using a resin to promote the reinforcement, the viscosity is controllable, the free hydroxyl content in the composition is low, and the storage stability is good.

The second object of the present disclosure is to provide a method for preparing the solvent-free silicon conformal coating.

DETAILED DESCRIPTION

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the Figures. Moreover, the formation of a first feature over or on a second feature in the description that follows may include embodiments in which the first and second features are formed in direct contact and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function.

The terms "including" and "comprising" are used in an open-ended fashion, and thus should be interpreted to mean "including, but not limited to."

The term "or" is intended to encompass both exclusive and inclusive cases, i.e., "A or B" is intended to be synonymous with "at least one of A and B," unless otherwise expressly specified herein.

In order to achieve the first object of the present disclosure, the present disclosure provides a solvent-free moisture curing silicone conformal coating, which mainly comprises the following components: (A) a hydrolyzable functional group-terminated linear polysiloxane (I); (B) a hydrolyzable functional group-containing silicone resin with a three-dimensional structure (II); (C) a hydrolyzable functional group-containing crosslinking agent; (D) a catalyst; (E) an adhesion promoter, Wherein, a weight ratio of (A) the hydrolyzable functional group-terminated linear polysiloxane (I) and (B) the hydrolyzable functional group-containing silicone resin (II) is 40-99: 1-60, preferably 50-85: 15-50, more preferably 60-80: 20-40, with respect to 100 parts by mass of the total amount of (A) hydrolyzable functional group-terminated linear polysiloxane (I) and (B) hydrolyzable functional group-containing silicone resin (II), the content of hydrolyzable functional group-containing crosslinking agent (C) is 0-20 parts by mass, preferably 1-10 parts by mass, more preferably 3-7 parts by mass; the content of catalyst (D) is 0.001-1 part by mass; the content of adhesion promoter (E) is 0.1-10 parts by mass, preferably 0.5-5 parts by mass, more preferably 1-3 parts by mass.

Further, the hydrolyzable functional group is selected from the group consisting of an alkoxy group, an alkyl alkoxy group, a ketoxime group, an acyloxy group or an allyloxy group, the alkoxy group is preferably methoxy, ethoxy, propoxy, butoxy or pentoxy, and the acyloxy group is preferably formyloxy or acetoxy.

Further, the (A) hydrolyzable functional group-terminated linear polysiloxane has a structural formula (I):

(I)

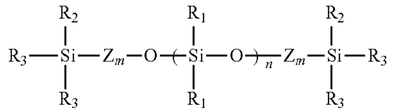

Where, $R_1$ is each independently a C1-18 alkyl group, a haloalkyl group or a C6-C18 aryl group such as phenyl, $R_1$ is preferably methyl; $R_3$ is each independently a hydrolyzable functional group, the hydrolyzable functional group is selected from an alkoxy group, an alkyl alkoxy group, a ketoxime group, an acyloxy group, an allyloxy group, etc., wherein $R_3$ is preferably methoxy; $R_2$ is each independently the same group as $R_1$ or $R_3$ (i.e., $R_2$ is a C1-C18 alkyl group, a haloalkyl group, a C6-C18 aryl group such as phenyl, or a hydrolyzable functional group, such as one of an alkoxy group, an alkyl alkoxy group, a ketoxime group, an acyloxy group, an allyloxy group, etc.); n is an integer from 0 to 500 (e.g. 10-500); Z is a hydrocarbylene group or a functional group containing one or more heteroatoms selected from O, N, and S, and m is an integer of 0 or 1.

The preparation method of (A) can refer to U.S. Pat. Nos. 4,711,928, 4,731,411, etc., or (A) can be commercially available products, such as alkoxy-terminated polysiloxane J-15 and J-200 produced by Jiangsu Kexing New Material Co., Ltd.

Further, the (B) hydrolyzable functional group-containing silicone resin with a three-dimensional structure has a structural formula (II):

$$(SiO_2)_x(R^aSiO_{1.5})_y(R^a{}_2SiO)_z(R^a{}_3SiO_{0.5})_p(R)_q \quad (II)$$

Wherein, $R^a$ is a C1-C18 alkyl group, a haloalkyl group or a C6-C18 aryl group, $R^a$ is preferably methyl; R is selected from an alkoxy group, an alkyl alkoxy group, a ketoxime group, an acyloxy group, or an allyloxy group, where $x>0$; $y\geq 0$; $z\geq 0$; $p>0$; $q>0$; $1.4\leq(y+2z+3p+q)/(x+y+z+p)<2$; and the content of R accounts for 0.5 wt %-5 wt % of the theoretical molecular weight of (II).

(B) The hydrolyzable functional group-containing silicone resin can be prepared by the following steps: dissolving the hydroxyl-containing silicone resin in a solvent, and then subjecting the hydroxyl-containing silicone resin to a capping reaction under the action of a capping agent and a capping catalyst to prepare the (B) hydrolyzable functional group-containing silicone resin (II). Where, the hydroxyl-containing silicone resin is preferably one or more of hydroxyl-containing MQ resin (such as Jiangxi Xinjiayi New Material Co., Ltd., XJY-8205, the synthesis method of which can be referred to US patents U.S. Pat. Nos. 2,676,182 and 3,284,406), MTQ resin or MTDQ resin (It can be obtained by co-hydrolysis of alkoxy monomers or chlorosilane monomers with different structures under acidic or alkaline catalysts, for example, refer to Chinese patent application CN 102898650A), which is a solid powder or flake at room temperature of 25° C. with a hydroxyl content of 0.05-3 wt %, preferably 0.1-1.0 wt %.

Further, the capping agent is an alkoxy-containing crosslinking agent, such as methyltrimethoxysilane, vinyltrimethoxysilane, methyl orthosilicate, methyltris(methylethylketoximino)silane, vinyltris(methylethylketoximino) silane, or methyltriacetoxysilane, preferably methyltrimethoxysilane.

Further, the capping catalyst is a basic or acidic condensation-type organic catalyst, such as triethylamine, diethylamine or oxalic acid.

Further, the temperature of the capping reaction is 0-100° C., preferably 25-60° C., the capping reaction time is 1-24 h, preferably 4-12 h.

Further, the solvent used in the capping reaction is a good solvent for silicon, examples of the solvents include hydrocarbon solvents such as heptane, hexane, or cyclohexane; aromatic solvents such as toluene or xylene; isoparaffin solvents such as Mobil ISOPAR C or ISOPAR E; or the other solvents such as hexamethyldisiloxane or octamethyltrisiloxane.

Further, the temperature of the vacuum distillation is 60-150° C., preferably 80-120° C., and the vacuum degree of the vacuum distillation is less than or equal to −0.085 MPa.

Further, the ratio of the molar weight of the capping agent to the molar weight of the hydroxyl group of the hydroxyl-containing silicone resin is 0.8:1-3:1.

Further, the ratio of the solvent to the hydroxyl-containing silicone resin is such that the solid content of the reactant is not higher than 70%, the ratio of the solvent to the hydroxyl-containing silicone resin is preferably 0.5:1-10:1.

Further, the (C) hydrolyzable functional group-containing crosslinking agent is a silane with at least two hydrolyzable functional groups, such as an alkoxy group, an alkyl alkoxy group, a ketoxime group, an acyloxy group or an allyloxy group.

Further, the (C) hydrolyzable functional group-containing crosslinking agent is an alkoxy-containing silane, such as methyltrimethoxysilane, methyltriethoxysilane, vinyltrimethoxysilane, vinyltriethoxysilane, methyl orthosilicate, ethyl orthosilicate or propyl orthosilicate; a ketoxime group-containing silane, such as methyltris(methylethylketoximino)silane, vinyltris(methylethylketoximino)silane, tetrakis (methylethylketoximino)silane, or dimethyl di(methyl ethyl ketoxime)silane; an acyloxy-containing silane, such as methyltriacetoxysilane, ethyltriacetoxysilane or vinyltriacetoxysilane; or an allyloxy-containing silane, such as methyltriallyloxysilane or vinyltriallyloxysilane.

Further, the (D) catalyst is one or more of the condensation-type catalysts containing chelates of titanium, tin, zirconium, zinc and bismuth. The tin-containing condensation-type catalyst is selected from the group consisting of transesterification products of dibutyltin dilaurate, dibutyltin diacetate, dibutyltin diacetylacetonate, stannous octoate, or dibutyltin diacetate and ethyl orthosilicate; the titanium-containing condensation-type catalyst is selected from the group consisting of diisopropoxy-bisethylacetoacetatotitanate, a product of diisopropoxy-bisethylacetoacetatotitanate and 1,3-propanediol, titanium naphthenate, butyl titanate, tetrakis (2-ethylhexanol) titanium or other DuPont Tyzor series titanium-containing catalysts; the zirconium-containing condensation-type catalyst is zirconium isooctanoate; the zinc-containing condensation-type catalyst is selected from zinc naphthenate or zinc isooctanoate; and the bismuth-containing condensation-type catalyst is selected from bismuth naphthenate.

Further, the (D) catalyst is preferably the condensation-type catalysts containing chelates of titanium or tin.

Further, the (D) catalyst is preferably 1,8-diazabicyclo [5.4.0]undec-7-ene (DBU).

Further, the adhesion promoter (E) is one or more of amino-containing or epoxy-containing silane coupling agents or oligomers thereof.

Further, the amino-containing coupling agent is selected from the group consisting of γ-aminopropyltriethoxysilane, γ-aminopropyltrimethoxysilane, N-(2-aminoethyl)-3-aminopropyltrimethoxysilane or aminosilane oligomers such as Evonik Dynasylan®1146; the epoxy-containing coupling agent is selected from 3-(2,3-glycidoxy)propyltrimethoxysilane, 2-(3,4-epoxycyclohexyl)ethyltrimethoxysilane or Momentive Coatosil MP200; other adhesion promoters such as 3-(methacryloxy)propyltrimethoxysilane, tris(3-trimethoxysilylpropyl)isocyanurate (Momentive A-link 597) and isocyanatopropyltrimethoxysilane are also suitable for the present disclosure.

Further, the adhesion promoter (E) is preferably an amino group-containing adhesion promoter.

The present disclosure also provides a method for preparing the silicon conformal coating, wherein comprising the following steps:

(a) Dissolving the hydroxyl-containing silicone resin in a solvent, and then subjecting the hydroxyl-containing silicone resin to a capping reaction under the action of a capping agent and a capping catalyst to prepare (B) a hydrolyzable functional group-containing silicone resin with a three-dimensional structure (II); then subjecting the (A) hydrolyzable functional group-terminated linear polysiloxane and the solvent-containing (B) hydrolyzable functional group-containing silicone resin with a three-dimensional structure (II) to vacuum distillation under heating until no distillate flowing out to obtain a base polymer;

Wherein the hydroxyl-containing silicone resin is preferably selected from one or more of hydroxyl-containing MQ resin, MTQ resin and MTDQ resin, the hydroxyl-containing silicone resin is a solid powder or flake at room temperature of 25° C. with a hydroxyl content of 0.05-3 wt %, preferably 0.1-1.0 wt %, which satisfies that the modified structure conforms to the formula (II).

Further, the capping agent is an alkoxy-containing crosslinking agent, such as methyltrimethoxysilane, vinyltrimethoxysilane, methyl orthosilicate, methyltris(methylethylketoximino)silane, vinyltris(methylethylketoximino) silane, and methyltriacetoxysilane, preferably methyltrimethoxysilane.

Further, the capping catalyst is a basic or acidic condensation-type organic catalyst, such as triethylamine, diethylamine or oxalic acid.

Further, the temperature of the capping reaction is 0-100° C., preferably 25-60° C., the capping reaction time is 1-24 h, preferably 4-12 h.

Further, the solvent used in the capping reaction is a good solvent for silicon, examples of the solvents include hydrocarbon solvents such as heptane, hexane, or cyclohexane; aromatic solvents such as toluene or xylene; isoparaffin solvents such as Mobil ISOPAR C or ISOPAR E; and other solvents such as hexamethyldisiloxane or octamethyltrisiloxane.

Further, the temperature of the vacuum distillation is 60-150° C., preferably 80-120° C., and the vacuum degree of the vacuum distillation is less than or equal to −0.085 MPa.

Further, the ratio of the molar weight of the capping agent to the molar weight of the hydroxyl group of the hydroxyl-containing silicone resin is 0.8:1-3:1.

Further, the amount of the capping catalyst is 0.5-3 wt % of the hydroxyl-containing silicone resin.

Further, the ratio of the solvent to the hydroxyl-containing silicone resin is such that the solid content of the reactant is not higher than 70%, and the ratio of solvent to hydroxyl-containing silicone resin is preferably 0.5:1-10:1.

(b) Mixing the base polymer prepared in step (a) and the hydrolyzable functional group-containing crosslinking agent (C), the catalyst (D) and the adhesion promoter (E) uniformly closed in a planetary stirred tank, vacuuming to remove bubbles, then sealing, charging with nitrogen and packing.

Further, the silicone conformal coating is cured by moisture; the curing conditions are 25±5° C., 50±10 RH %; after moisture curing, the tensile strength of the silicone conformal coating is more than or equal to 0.5 MPa, and the elongation at break is more than or equal to 50%, which can meet the three-proof protection of circuit boards in the electrical and electronic industries.

The present disclosure therefore further provides the use of the silicone conformal coating for the surface protection of circuit boards in the electrical and electronic industries.

The benefits of the present disclosure are as follows: the solvent-free conformal coating of the present disclosure has low viscosity, high strength and good toughness, and can meet the traditional coating process such as spraying, brushing, dipping, etc., while satisfying the surface protection of the circuit board. Compared with the traditional solvent-based silicon conformal coating, the solvent-free silicon conformal coating can be cured by moisture, the VOC content released during the curing process is low, and the harm to the environment and occupational health is small.

The following examples further illustrate the present disclosure. Wherein, parts are parts by weight, unless otherwise specified.

Synthesis Example 1

In a nitrogen-blanketed and heated 2 L four-neck flask with a stir bar and a condenser, 1000 g of α, ω-divinyl polydimethylsiloxane (vinyl silicone oil, Jiangsu Kexing New Materials Co., Ltd., V-300) with a viscosity of 300 mPa·s, 34 g of trimethoxysilane, and 0.4 g of Karstedt catalyst with a Pt content of 5000 ppm were added, reacted at 120° C. for 4 h to obtain a trimethoxysilyl-terminated polydimethylsiloxane with a viscosity of 450 mPa·s (A1).

Synthesis Example 2

In a nitrogen-blanketed and heated 2 L four-neck flask with a stir bar and a condenser, 1000 g of α, ω-dihydroxy polydimethylsiloxane (hydroxy silicone oil, Zhejiang Rongligao New Material Co., Ltd., 400cs-107) with a viscosity of 400 mPa·s, and 80 g of vinyltris(methylethylketoximino)silane were added, reacted at 80° C. for 4 h, subjected to vacuum distillation to remove the methylethylketoxime produced by the reaction and unreacted vinyltris (methylethylketoximino)silane under the conditions of 90° C. and a vacuum degree of less than or equal to −0.085 MPa to obtain a vinylbis(methylethylketoximino)silane-terminated polydimethylsiloxane with a viscosity of 500 mPa·s (A2).

Synthesis Example 3

In a nitrogen-blanketed and heated 2 L four-neck flask with a stir bar and a water segregator, 700 g of methyl MQ silicone resin (Jiangxi Xinjiayi New Material Co., Ltd., XJY-8205) with a hydroxyl content of 0.8% and an M/Q ratio of 0.75 was added, and 300 g of toluene was added thereto to dissolve the above resin. Under reflux condensing conditions, the solution was subjected to reflux and water separation till no water flowing out and then it was changed to a reflux device. At the same time, 70 g of methyltrimethoxysilane (capping agent) and 10.5 g of diethylamine (capping catalyst) were added, and reacted at 60° C. under reflux with nitrogen for 12 h to obtain a methoxy-terminated methyl MQ silicone resin (B1).

Synthesis Example 4

In a nitrogen-blanketed and heated 2 L four-neck flask with a stir bar and a water segregator, 700 g of methyl MQ silicone resin (Shandong Dayi Chemical Co., Ltd., DY-MQ10) with a hydroxyl content of 0.5% and an M/Q ratio of 0.7 was added, and 300 g of toluene was added thereto to dissolve the above resin. Under reflux condensing conditions, the solution was subjected to reflux and water separation till no water flowing out and then it was changed to a reflux device. At the same time, 90 g of methyltris(methylethylketoxime)silane (capping agent) and 10.5 g of diethylamine (capping catalyst) were added, and reacted at 60° C. under reflux with nitrogen for 12 h to obtain a methylethylketoxime-terminated methyl MQ silicone resin (B2).

Preparation Example 1

The trimethoxysilyl-terminated polydimethylsiloxane (A1) prepared in Synthesis Example 1 and the methoxy-terminated methyl MQ silicone resin (B1) prepared in Synthesis Example 3 were mixed according to the ratio of effective content (mass ratio) of 75:25, and distilled under reduced pressure at 120° C. and a vacuum degree of less than or equal to −0.085 MPa until no distillate flowing out to obtain a base glue 1.

Preparation Example 2

The vinylbis(methylethylketoximino)silane-terminated polydimethylsiloxane (A2) prepared in Synthesis Example 2 and the methylethylketoxime-terminated methyl MQ silicone resin (B2) prepared in Synthesis Example 4 were mixed according to the ratio of effective content (mass ratio) of 75:25, and distilled under reduced pressure at 120° C. and a vacuum degree of less than or equal to −0.085 MPa until no distillate flowing out to obtain a base glue 2.

Preparation Example 3 (not the Present Disclosure)

The α, ω-dihydroxy polydimethylsiloxane (hydroxy silicone oil) used in Synthesis Example 2 and the hydroxyl-containing MQ resin used in Synthesis Example 4 were mixed in a mass ratio of 75:25, a certain amount of toluene was added to promote the dissolution and dispersion of the resin in the hydroxy silicone oil, and distilled under reduced pressure at 120° C. and a vacuum degree of less than or equal to −0.085 MPa until no distillate flowing out to obtain a base glue 3.

Preparation Example 4

The trimethoxysilyl-terminated polydimethylsiloxane (A1) prepared in Synthesis Example 1 and the methoxy-terminated methyl MQ silicone resin (B1) prepared in Synthesis Example 3 were mixed according to the ratio of effective content (mass ratio) of 60:40, and distilled under reduced pressure at 120° C. and a vacuum degree of less than or equal to −0.085 MPa until no distillate flowing out to obtain a base glue 4.

Preparation Example 5

The trimethoxysilyl-terminated polydimethylsiloxane (A1) prepared in Synthesis Example 1 and the methoxy-terminated methyl MQ silicone resin (B1) prepared in Synthesis Example 3 were mixed according to the ratio of effective content (mass ratio) of 80:20, and distilled under reduced pressure at 120° C. and a vacuum degree of less than or equal to −0.085 MPa until no distillate flowing out to obtain a base glue 5.

Example 1 (the Present Disclosure)

The base glue 1 prepared in Preparation Example 1 was added into the planetary stirred tank, according to 100 parts of base glue 1, 6 parts of methyltrimethoxysilane was added thereto as a crosslinking agent, 0.5 parts of Nitto Kasei U-303 was added as a catalyst, 1 part of γ-aminopropyltriethoxysilane was added as an adhesion promoter, and stirred to remove bubbles to obtain a solvent-free silicone conformal coating with a viscosity of 600 mPa·s. The surface drying time, adhesion, mechanical strength and storage stability are shown in table 1.

Example 2 (the Present Disclosure)

The base glue 2 prepared in Preparation Example 2 was added into the planetary stirred tank, according to 100 parts of base glue 1, a mixture of 3 parts of methyltris(methylethylketoximino)silane and 3 parts of vinyltris(methylethylketoximino)silane was added as a crosslinking agent, 0.2 part of dibutyltin dilaurate was added as a catalyst, and 1 part of γ-aminopropyltriethoxysilane was added as adhesion promoter, and stirred to remove bubbles to obtain a solvent-free silicone conformal coating with a viscosity of 750 mPa·s. The surface drying time, adhesion, mechanical strength and storage stability are shown in table 1.

Example 3 (not the Present Disclosure)

The trimethoxysilyl-terminated polydimethylsiloxane (A1) prepared in Synthesis Example 1 was added into the planetary stirred tank, according to 100 parts of base glue 1, 3 parts of methyltrimethoxysilane was added thereto as a crosslinking agent, 0.5 part of Nitto Kasei U-303 was added as a catalyst, 1 part of γ-aminopropyltriethoxysilane was added as an adhesion promoter, and stirred to remove bubbles to obtain a solvent-free silicone conformal coating with a viscosity of 300 mPa·s. The surface drying time, adhesion, mechanical strength and storage stability are shown in table 1.

Example 4 (not the Present Disclosure)

The base glue 3 prepared in Preparation Example 3 was added into the planetary stirred tank and heated to 100° C., according to 100 parts of base glue 3, 3 parts of methyltrimethoxysilane was added thereto as a crosslinking agent, 1.5 parts of diisopropoxy-bisethylacetoacetatotitanate was added as a catalyst, and 1 part of tris(3-trimethoxysilylpropyl)isocyanurate was added as an adhesion promoter, and stirred to remove bubbles and cooled to room temperature to obtain a solvent-free silicone conformal coating with a viscosity of 900 mPa·s. The surface drying time, adhesion, mechanical strength and storage stability are shown in table 1.

TABLE 1

Performance of the solvent-free silicone conformal coatings prepared in the examples

| example | surface drying time [b] (min) | tensile strength [c] (MPa) | elongation at break [c] (%) | damage form on the surface of F4R board | surface drying time after enclosed aging at 80° C. for 72 h (min) |
|---|---|---|---|---|---|
| Example 1 | 10 | 0.7 | 70 | cohesive failure | 15 |
| Example 2 | 12 | 0.65 | 80 | cohesive failure | 17 |
| Example 3 | 8 | —[a] | —[a] | cohesive failure | 10 |
| Example 4 | 15 | 0.6 | 75 | cohesive failure | 45 |

Note:
[a]Due to the low strength, it is impossible to prepare the sample to detect the strength.
[b] The test condition of surface drying time is 23 ± 2° C., 55 ± 10 RH %.
[c] The test of mechanical performance is to test the mechanical performance of the specimens in accordance with the requirements of GB/T 528 after curing for 7 d under the conditions of 23 ± 2° C. and 55 ± 10 RH %.

According to the comparison between Examples 1 and 2 and Example 3, it can be seen that the hydrolyzable functional group-containing silicone resin can significantly improve the strength and toughness of the solvent-free moisture curing silicone conformal coating. According to the comparison between Examples 1 and 2 and Example 4, it can be seen that through functional group modification, the storage stability of solvent-free silicone conformal coatings can be greatly improved. After high temperature accelerated storage and aging, the surface drying time is more stable.

The description of the above embodiments is only used to help understand the method and core idea of the present disclosure. It should be pointed out that for the persons skilled in the art, without departing from the principle of the present disclosure, several improvements and modifications can be made, and these improvements and modifications also fall within the protection scope of the claims of the present disclosure. Various modifications to these embodiments are obvious to those skilled in the art, and the general principles defined herein can be implemented in other embodiments without departing from the spirit or scope of the present disclosure.

Therefore, the present disclosure will not be limited to the embodiments shown in this document, but should conform to the widest scope consistent with the principles and novel features disclosed in this document.

Various terms have been defined above. To the extent a term used in a claim is not defined above, it should be given the broadest definition persons in the pertinent art have given that term as reflected in at least one printed publication or issued patent. All numerical values in this disclosure may be exact or approximate values unless otherwise specifically stated. Accordingly, various embodiments of the disclosure may deviate from the numbers, values, and ranges disclosed herein without departing from the intended scope.

Furthermore, all patents, test procedures, and other documents cited in this application can be fully incorporated by reference to the extent such disclosure is not inconsistent with this application and for all jurisdictions in which such incorporation is permitted.

While the foregoing is directed to more preferred embodiments of the present invention, other and further embodiments of the invention may be devised without departing from the basic scope thereof, and the scope thereof is determined by the claims that follow.

What is claimed is:

1. A solvent-free moisture curing silicone conformal coating, comprising:

(A) a hydrolyzable functional group-terminated linear polysiloxane (I); (B) a hydrolyzable functional group-containing silicone resin with a three-dimensional structure (II); (C) a hydrolyzable functional group-containing crosslinking agent; (D) a catalyst; and (E) an adhesion promoter, wherein, a mass ratio of (A) the hydrolyzable functional group-terminated linear polysiloxane (I) and (B) the hydrolyzable functional group-containing silicone resin (II) is 75-99: 1-25, with respect to 100 parts by mass of the total amount of (A) hydrolyzable functional group-terminated linear polysiloxane (I) and (B) hydrolyzable functional group-containing silicone resin (II), the content of crosslinking agent (C) is 0-20 parts by mass; the content of catalyst (D) is 0.001-1 part by mass; and the content of adhesion promoter (E) is 0.1-10 parts by mass.

2. The silicone conformal coating according to claim 1, wherein the mass ratio of (A) the hydrolyzable functional group-terminated linear polysiloxane (I) and (B) the hydrolyzable functional group-containing silicone resin (II) is 75-85: 15-25.

3. The silicone conformal coating according to claim 1, wherein (A) the hydrolyzable functional group-terminated linear polysiloxane has a structural formula (I):

(I)

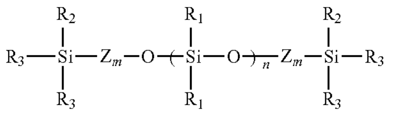

where, $R_1$ is each independently a C1-18 alkyl group, a haloalkyl group or a C6-C18 aryl group; $R_3$ is each independently a hydrolyzable functional group; $R_2$ is the same group as $R_1$ or $R_3$; n is an integer from 0 to 500; Z is a hydrocarbylene group or a functional group containing one or more heteroatoms selected from O, N, and S, and m is an integer of 0 or 1.

4. The silicone conformal coating according to claim 1, wherein the (B) hydrolyzable functional group-containing silicone resin with a three-dimensional structure has a structural formula (II):

$$(SiO_2)_x(RaSiO_{1.5})_y(Ra_2SiO)_z(Ra_3SiO_{0.5})_p(R)_q \quad (II)$$

wherein, Ra is a C1-C18 alkyl group, a haloalkyl group or a C6-C18 aryl group; R is selected from an alkoxy group, an alkyl alkoxy group, a ketoxime group, an acyloxy group, or an allyloxy group, where $x>0$; $y\geq0$; $z\geq0$; $p>0$; $q>0$; $1.4\leq(y+2z+3p+q)/(x+y+z+p)<2$; and the content of R accounts for 0.5 wt %-5 wt % of the theoretical molecular weight of (II).

5. The silicone conformal coating according to claim 1, wherein the content of (C) hydrolyzable functional group-containing crosslinking agent is 1-10 parts by mass.

6. The silicone conformal coating according to claim 1, wherein the (D) catalyst is one or more of the condensation-type catalysts containing chelates of titanium, tin, zirconium, zinc or bismuth.

7. The silicone conformal coating according to claim 6, wherein the (D) catalyst is one or more of the condensation-type catalysts containing chelates of titanium or tin.

8. The silicone conformal coating according to claim 1, wherein the (D) catalyst is a non-metallic catalyst, and the non-metallic catalyst is 1,8-diazabicyclo [5.4.0]undec-7-ene.

9. The silicone conformal coating according to claim 1, wherein the adhesion promoter (E) is one or more of amino-containing or epoxy-containing silane coupling agents or oligomers thereof.

10. The silicone conformal coating according to claim 1, wherein the adhesion promoter (E) is 3-(methacryloxy) propyltrimethoxysilane, tris(3-trimethoxysilylpropyl)isocyanurate or isocyanatopropyltrimethoxysilane.

11. A curing method of the silicone conformal coating according to claim 1, wherein the silicone conformal coating is cured by moisture.

12. The curing method according to claim 11, wherein the curing conditions are 25±5° C., 50±10 RH %.

13. A method for preparing the silicon conformal coating according to claim 1, wherein comprising the following steps:

(1) dissolving a hydroxyl-containing silicone resin in a solvent, and then subjecting the hydroxyl-containing silicone resin to a capping reaction under the action of a capping agent and a capping catalyst to prepare (B) a hydrolyzable functional group-containing silicone resin with a three-dimensional structure (II); then subjecting the (A) hydrolyzable functional group-terminated linear polysiloxane (I) and the solvent-containing (B) hydrolyzable functional group-containing silicone resin with a three-dimensional structure (II) to vacuum distillation under heating until no distillate flowing out to obtain a base polymer; and (2) mixing the base polymer and the hydrolyzable functional group-containing crosslinking agent (C), the catalyst (D) and the adhesion promoter (E) uniformly closed in a planetary stirred tank, vacuuming to remove bubbles, then sealing, charging with nitrogen and packing.

14. The preparation method according to claim 13, wherein the hydroxyl-containing silicone resin is selected from one or more of hydroxyl-containing MQ resin, MTQ resin and MTDQ resin.

15. The preparation method according to claim 13, wherein the capping catalyst is a basic or acidic condensation-type organic catalyst.

16. The preparation method according to claim 13, wherein the temperature of the capping reaction is 0-100° C.

17. The preparation method according to claim 13, wherein the solvent used in the capping reaction is a good solvent for silicon.

18. The preparation method according to claim 13, wherein the temperature of the vacuum distillation is 60-150° C.

19. The preparation method according to claim 13, wherein the ratio of the molar weight of the capping agent to the molar weight of the hydroxyl group of the hydroxyl-containing silicone resin is 0.8:1-3:1.

20. The preparation method according to claim 13, wherein the ratio of the solvent to the hydroxyl-containing silicone resin is such that the solid content of the reactant is not higher than 70%.

* * * * *